UNITED STATES PATENT OFFICE.

HELON B. MacFARLAND, OF CHICAGO, ILLINOIS, AND ROBERT J. SHOEMAKER, OF TOPEKA, KANSAS; SAID SHOEMAKER ASSIGNOR TO SAID MacFARLAND.

INSULATING MATERIAL.

1,146,189.

Specification of Letters Patent. Patented July 13, 1915.

No Drawing. Application filed November 26, 1913. Serial No. 803,207.

*To all whom it may concern:*

Be it known that we, HELON B. MACFARLAND and ROBERT J. SHOEMAKER, citizens of the United States, residing at Chicago, in the county of Cook and State of Illinois, and Topeka, in the county of Shawnee and State of Kansas, respectively, have invented certain new and useful Improvements in Insulating Material, of which the following is a specification.

Our invention relates to the production of a fibrous material suitable for use particularly as a heat insulator though probably susceptible of being used in other analogous situations.

The principal objects of the invention are, first, to provide an insulating material in the form of a relatively thin sheet or board adapted, for example, to be placed in the walls of a building or other like structure, which will be tough and tenacious in its character so that it will not be readily torn, pliable in order that it may not be easily broken in handling or by vibration of the structure with which it is used, or other like causes, and at the same time sufficiently felt-like or cellular to make a good insulator, and which, furthermore, will be of such composition and texture that when it is rolled out or otherwise pressed or formed into sheets, these sheets will be of uniform thickness and density; and, second, to utilize, for the production of such insluating sheets or boards, a raw material which is plentifully supplied by nature, and because not used to any extent in the arts has little or no commercial value, and which, furthermore, can be converted into the desired condition and form by methods that are simple, expeditious and inexpensive.

The invention contemplates using as a raw material certain sea plants, specifically the plant commonly called eel grass *Zostera marina* of the botanical family of *Naiadaceæ.*)

In this application we seek to patent our novel product as such. The novel features of the method whereby said product is produced is not claimed herein as the method is the subject of a co-pending application filed by us of even date herewith bearing Serial No. 803,208.

The insulating material of our invention is preferably made as follows, although it will be understood that the invention is not to be considered as limited to the specifically described process nor to the particular agents employed. The raw material, eel grass, is first cooked or boiled in an alkaline solution—preferably a two per cent. solution of caustic soda—for a period of from one to six hours. The boiling may be done either at atmospheric pressure or under steam pressure. This treatment frees and dissolves out from the fibrous or cellular constituent of the plant, a portion of the pectic, resinous and nitrogenous matters. These last mentioned substances are removed by any suitable treatment, for example, by suspending the material in a large volume of water and agitating the same either mechanically or by means of compressed air. The fibrous constituent is then recovered from the water in any suitable manner. The product in this condition lacks the toughness, stability and closeness of texture which it is desirable that a sheet of insulating material should have, particularly when employed in the situations above noted. In order to give the product these qualities, our invention contemplates further treatment as follows: A portion of the material subjected to the alkaline treatment above described is immersed in an acid bath. Any suitable acid may be used. Preferably we employ a very dilute sulfuric acid, the material being suspended in this acid for a short time, say from five to fifteen minutes.

Although the precise chemical reactions taking place when the acid comes into contact with the material cannot be stated with absolute accuracy, due to the complex chemical character of the material, the acid apparently dissolves out the residue of the pectic, resinous and nitrogenous matter not removed by the alkaline treatment, frees the cellulose constituent from a large part of the insoluble mineral and other substances, by changing such substances into soluble compounds, and converts the cellulose into hydro-cellulose in the sense of the following formula:

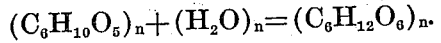

$(C_6H_{10}O_5)_n + (H_2O)_n = (C_6H_{12}O_6)_n.$

After the acid treatment the material is again washed with water to remove the acid and soluble substances. In physical structure the resultant material is a more or less gummy mass but still somewhat fibrous in character. If this material is rolled out into sheets it will be found to be somewhat more brittle and more dense than is desirable, and to obtain a product which will have all the desired qualities we mix a certain amount of the material subjected to the acid treatment as above described with material which has been treated only with the alkali. For example, a very excellent product is obtained by mixing together, while both constituents are wet, seventy per cent. of the material treated with the alkali and thirty per cent. of the material treated first with the alkali and then with the acid. The mixing is advantageously carried on by suspending both constituents in a large volume of water and agitating by compressed air, or mechanically, from one to six hours until the mixture is perfectly homogeneous. The water is then drained off and the material rolled into sheets of the desired thickness. The character of the product is such that these sheets will be uniform in thickness, homogeneous in texture and of equal porosity throughout, besides being both very tough and very pliable. The material is not liable to decomposition by heat or water. A heat insulating material to be effective and durable should have all of these qualities.

While a material composed as last described best exemplifies our invention, it is possible to obtain a useful product by mixing with raw eel grass the substance obtained from this plant by treating the same first with an alkali and then with an acid as described above. In other words, it is possible to substitute the raw material for the material boiled in the alkaline solution.

While we prefer to use for the production of our insulating compound the particular marine plant referred to, it is realized that our invention might be utilized for the production of a product, which would have some if not all of the advantageous features of the compound described, employing as a raw material other marine plants than the *Zostera marina*, or other vegetable matter of a generally similar character.

One of the difficulties in utilizing marine plants for the production of boards or sheets suitable for insulating purposes is due to the difficulty of removing the mineral salts which such plants contain in excess because of the nature of their habitat. Our method successfully accomplishes this result, thereby making it possible to obtain a material which satisfies the several requirements of a conveniently handled and effective heat insulating compound. Furthermore, we do not wish to be understood as limiting our invention to the particular agents and steps or other specified details of the method of producing the material. For example, in producing the preferred form of material it will be possible to omit the first washing step, that is, the washing of the material after treatment with the alkali, since the removal of the non-fibrous constituents freed by the boiling in the alkaline solution may be postponed until the washing which takes place when the acid treated material is suspended in water and mixed with the alkali treated ingredient. These obviously may be varied as conditions require. While the material of our invention, because of the characteristics described, is particularly useful as a heat insulating material for refrigerating plants, ice-houses, refrigerator cars, steel passenger cars, and the like, it will be obvious that it might be utilized to some advantage in other situations where similar conditions are present. For instance, by suitably treating the sheets the material might be used for fireproofing purposes or for waterproofing. The material might also be advantageously used for deadening sound.

We claim:

1. An insulating material consisting of fibers of *Zostera marina* and hydrocellulose derived from the fibers of said plant mixed together and in the form of a felted sheet of homogeneous texture.

2. An insulating material consisting of the fibers of *Zostera marina* and hydrocellulose derived from the fibers of said plant mixed together in the proportion of approximately seventy per cent. of the former to thirty per cent. of the latter and in the form of a felted sheet of homogeneous texture.

3. An insulating material consisting of a homogeneous mixture of the fibers of the *Zostera marina* freed from non-fibrous constituents of the plant, and a gummy substance derived from the fibers of said plant.

4. An insulating material consisting of a homogeneous mixture of vegetable fibers with a substance derived from vegetable fibers by hydrolysis.

5. An insulating material consisting of fibers of vegetable matter freed from non-fibrous material and hydro-cellulose derived from like fibers, mixed together and in the form of a felted sheet, homogeneous in texture and uniform in thickness.

6. An insulating material consisting of fibers of *Zostera marina* freed from the non-fibrous constituents of the plant and a hydro-cellulose derived from like fibers, mixed together and in the form of a felted sheet of homogeneous texture and substantially uniform thickness.

HELON B. MacFARLAND.
ROBERT J. SHOEMAKER.

Witnesses:
L. A. FALKENBERG,
H. M. GILLESPIE.